United States Patent [19]

Cogan et al.

[11] Patent Number: 4,715,957
[45] Date of Patent: Dec. 29, 1987

[54] CORN-WATER SLURRY SEPARATOR DEVICE

[75] Inventors: Kevin C. Cogan, Carrollton; Edward L. Ouellette, Corinth; Martin Morua, Irving, all of Tex.

[73] Assignee: Frito-Lay, Inc., Dallas, Tex.

[21] Appl. No.: 858,867

[22] Filed: May 1, 1986

Related U.S. Application Data

[63] Continuation of Ser. No. 608,380, May 9, 1984, abandoned.

[51] Int. Cl.$^4$ ............... B04C 5/10; B01D 53/24
[52] U.S. Cl. ............... 210/497.3; 210/521.1; 209/211
[58] Field of Search ............... 210/497.3, 499, 512.1; 209/392, 144, 397, 211

[56] References Cited

U.S. PATENT DOCUMENTS

| | | | |
|---|---|---|---|
| 2,892,546 | 6/1959 | Riedel | 210/497.3 |
| 3,527,349 | 9/1970 | Lynch | 210/497.3 |
| 3,771,290 | 11/1973 | Stethem | 210/512.1 |
| 3,794,164 | 2/1974 | Ginaven | 210/499 |
| 3,946,679 | 3/1976 | Varani | 210/512.1 |
| 4,048,067 | 9/1977 | Cheng | 210/512.1 |
| 4,179,273 | 12/1979 | Montusi | 210/512.1 |
| 4,280,902 | 7/1981 | Jacobsen et al. | 210/512.1 |

OTHER PUBLICATIONS

Exhibit A, entitled "Hycor Liquid Solid Separation-Hydroscreen".
Exhibit B, entitled "Forsberg-Model 200-V Vacuum Gravity Separator".
Exhibit C, entitled "C-E Bauer Bulletin G-33 Liquid Cyclones".
Exhibit D, entitled "C-E Bauer Bulletin G-444 Clarifiers".
Exhibit E, entitled "C-E Bauer Bulletin G-304 Hydrasieve Screens".
Exhibit F, entitled "Kason".
Exhibit G, entitled "Vibratory Screening".
Exhibit H, entitled "Gump-Bar-Nun".
Exhibit I, entitled "Gump CP-32 Pressure Sifter".

Primary Examiner—Richard V. Fisher
Assistant Examiner—Wanda L. Millard
Attorney, Agent, or Firm—Jacob W. Sietsema; Thomas P. Schur; G. Franklin Rothwell

[57] ABSTRACT

An apparatus for dewatering a corn-water slurry which is inexpensive to build and operate. The device comprises an inverted conical unit having porous walls which permit the passage of water, debris and broken corn pieces therethrough but retains undamaged corn within the porous walls. The corn-water slurry is injected tangentially into the upper portion of the device and follows a generally downward spiral path, whereby the water is centrifugally removed through the porous wall structure, with the undamaged corn exiting through a lower exit port.

4 Claims, 4 Drawing Figures

CORN-WATER SLURRY SEPARATOR DEVICE

This is a continuation of application Ser. No. 608,380 filed May 9, 1984, now abandoned.

BACKGROUND OF THE INVENTION

During the manufacture of corn-based snack chips, such as tortilla chips, raw corn is subjected to a number of processing steps prior to being fried into the final product. Typically, these steps consist of (1) cooking in water, (2) soaking in water (the water containing a relatively small amount of lime for maintenance of pH), (3) washing the cooked and soaked corn to remove non-corn debris, corn husks, small pieces of corn, etc., (4) milling the washed corn and (5) extruding or shaping the milled corn into the desired shape prior to frying. This process has been perfected over a period of years, with the only remaining serious defect in the process arising during the washing of the corn. With currently available technology, the corn washing results in damaged corn and uneven quantities of corn leaving the washer and entering the milling unit, known as "surge".

Typical corn washing units in use today consist of a receiver portion and a hopper portion. The corn washer receiver receives the corn/water slurry from the soak unit under pressure, and is designed to minimize damage to the corn by decelerating the corn slurry prior to its entry into the corn washer hopper. The corn washer receiver currently in widespread use is relatively simple and generally maintenance free, but has several design deficiencies which lead to surging and lower yield (because of corn damage). An apparatus designed to alleviate these problems is a corn washer unit designed by HyCor Corporation and manufactured under the trade name "Rotostrainer". This device decelerates the corn slurry from the soak unit and dewaters the corn prior to depositing the corn in a corn washer. The dewatering action of this unit is accomplished by passing the corn slurry over a rotating screen drum so that the water drains through the screen while the corn is retained thereon. As the drum continues rotating, the corn eventually falls into the corn washer hopper. The design of the Rotostrainer is intended for use in a continuous operation—the capacity is insufficient for use in a batch process where large quantities of slurry are deposited on the dewatering device at one time. While this device performs well in its intended function, the cost (on the order of 10 to $15,000) and complexity induced applicants to design a simpler, less expensive unit.

An object of the present invention is to provide a means of decelerating the corn-water slurry as it enters the corn washer hopper so that less damage to the corn, which is very soft from cooking and soaking, would result. The damaged or broken corn, being substantially smaller in size than normal corn kernels, is lost in the corn washer (exiting with the wash water), thereby resulting in lower process yields. Broken corn that is retained in the washer and which moves through the hopper and into the milling unit produces undesirable inconsistencies in the finished product quality, since broken corn contains different amounts of moisture than whole corn, affecting the appearance, texture and oil content of finished corn chips.

A second object of the present invention is to reduce or eliminate corn washer surge that occurs in conventional prior art processes. Because the corn-water slurry is transferred from the soaking unit to the washer in a "batch" mode, the corn exiting the corn washer receiver and entering the corn washer hopper is still primarily in slurry form since little or no water is removed in the receiver. The takeout auger at the bottom of the hopper is designed to meter a controlled amount of corn (with whatever residual water is not separated there from) to a final corn washer unit and then to the milling unit. When a new load of corn-water slurry is delivered to the corn washer hopper from the receiver, a substantial amount of water necessarily flows into the auger unit and carries corn with it. Because this corn is prematurely removed from the corn washer hopper, it creates a momentary overload on the corn washer and thus is not cleaned as well as washed corn not carried through the washer in a surge. Also, the excess corn in the auger results in extra corn being delivered to the milling unit, resulting in inconsistent final product. Therefore, there is a need for a low cost, low maintenance corn dewatering device which will deliver uniformly clean corn to a milling unit at a uniform rate.

SUMMARY

The present invention comprises a dewatering device for separating a corn-water slurry into its component parts. After raw corn is cooked and soaked, the corn-water slurry is introduced onto a corn washer to remove undesirable detritus from the corn prior to transporting the cleaned corn to a milling unit. The dewatering device of the present invention comprises an inverted conical unit tapering from top to bottom, and having porous walls with an upper inlet port and a lower exit port. When the corn-water slurry is tangentially injected into the upper port, the slurry follows a generally downward spiral path, with the water in the slurry being removed centrifugally through the porous walls. The aperatures in the walls are small enough to retain whole corn pieces, the corn exiting through the lower exit port for transfer to the milling unit. The device of the present invention incorporates no moving parts and therefore is inexpensive to build and maintain. It has been found that a substantial portion of the water in the corn-water slurry can be removed by use of the present invention, and very little corn damage results therefrom. Because most of the water is removed from the corn-water slurry in the device of the present invention prior to entering the corn washer hopper, surging of corn through the hopper and eventually to the milling unit is essentially eliminated.

Figure 1:
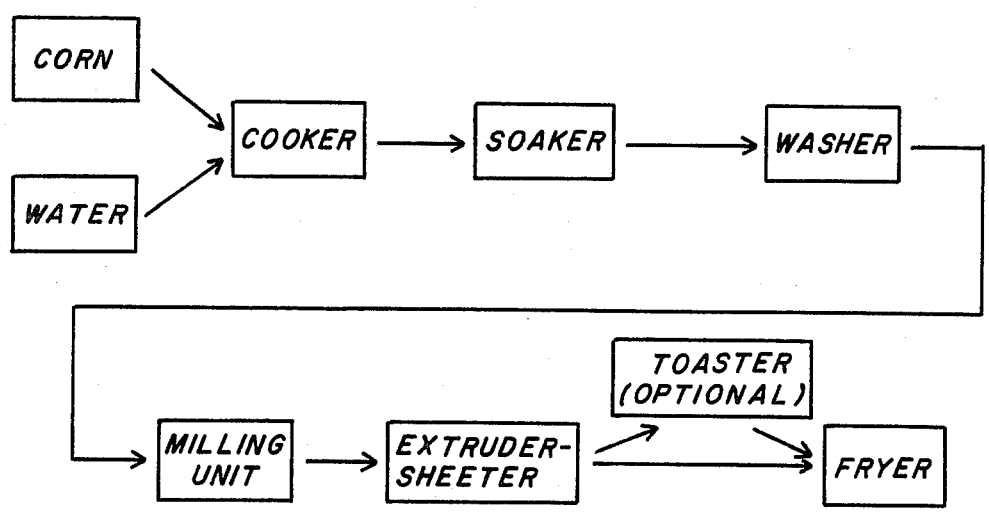
FIG. 1 is a flow diagram of the process for producing a fried corn chip.

While the invention is susceptible to various modifications and alternative forms, specific embodiments thereof have been shown by way of example in the drawings and will herein be described in detail. It should be understood, however, that this is not intended to limit the invention to the particular forms disclosed, but to cover all modifications, equivalents and alternatives falling within the spirit and scope of the invention as expressed in the appended claims.

DETAILED DESCRIPTION OF THE INVENTION

Figure 2:
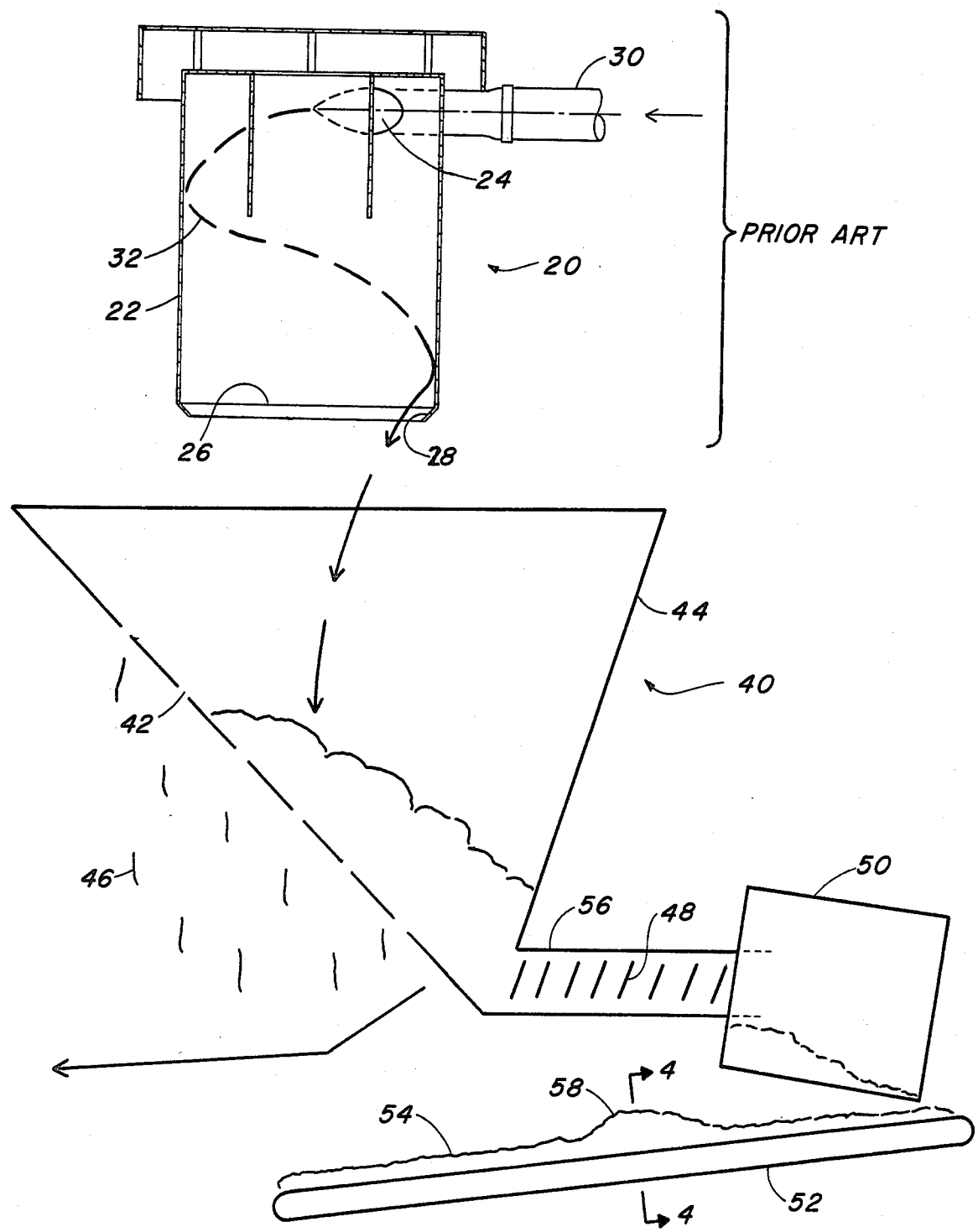
FIG. 2 is a schematic side elevation view of a prior art corn washer receiver-corn washer hopper unit.

The manufacture of Corn Chips, such as Frito-Lay's DORITOS® brand corn chips or TOSTITOS® brand corn chips (made by a sheeting process) or FRITOS® brand corn chips (made by an extrusion process) involves the cooking, soaking, washing, milling, forming and toasting (optional) of corn prior to frying. The preparation of raw corn prior to milling is of critical importance in maintaining uniform product quality. As shown in FIG. 1, corn and water are cooked in a cooking unit, the cooked corn is transferred to a soaking unit and after sufficient soaking time the corn-water slurry is transferred to a washing unit. The washing unit comprises a receiving portion, a hopper portion and a washing drum. As indicated in FIG. 2, the common practice prior to the invention disclosed herein had been to provide a corn washer receiver, indicated generally at 20, in the form of a tubular member 22 having an inlet port 24 and a discharge port 26 defined by an inwardly angled lip 28. The corn water slurry from the soaking unit entered the receivr unit 20 through conduit 30 and followed a generally spiral path, indicated by dashed line 32 and exited the receiver unit through the discharge port 26. Lip 28 is positioned such that the corn-water slurry impinged on the lip 28 prior to entering the hopper unit, generally indicated at 40 in FIG. 2 in order to decrease the relatively high velocity of the slurry.

The corn washer receiver unit 20, labeled PRIOR ART in FIG. 2, produced the aforementioned undesirable results of inflicting substantial damage on the corn and delivering to the corn washer hopper unit 40 a slurry containing large amounts of water. Because the transfer of the corn-water slurry from the soaking unit to the washing unit is done on a batch basis (the amount of corn required for 15 minutes production of corn chips is transferred to the hopper unit and metered out therefrom), a substantial quantity of the slurry is dumped into the hopper unit.

The hopper unit 40 comprises an inverted conical section with a portion 42 thereof being porous and a second portion 44 being nonporous. This results in a portion of the water 46 of the corn-water slurry draining through the porous section 42 of the hopper, the corn remaining therein. An auger 48 is designed to meter the corn to a final washing drum member 50, after which it is deposited upon a moving conveyor belt 52 as a bed of corn 54. However, because a large quantity of the slurry is dropped into the hopper while the last poriton of corn from the previous batch is being metered through the auger into the drum 50, the water in the new batch of slurry does not completely drain through the porous portion of the hopper but rather drains into the auger housing 56, thereby carrying an excess quantity of corn with it. Such a "surge" is represented on the conveyor 52 as an inordinately large deposit of corn 58.

Figure 3:
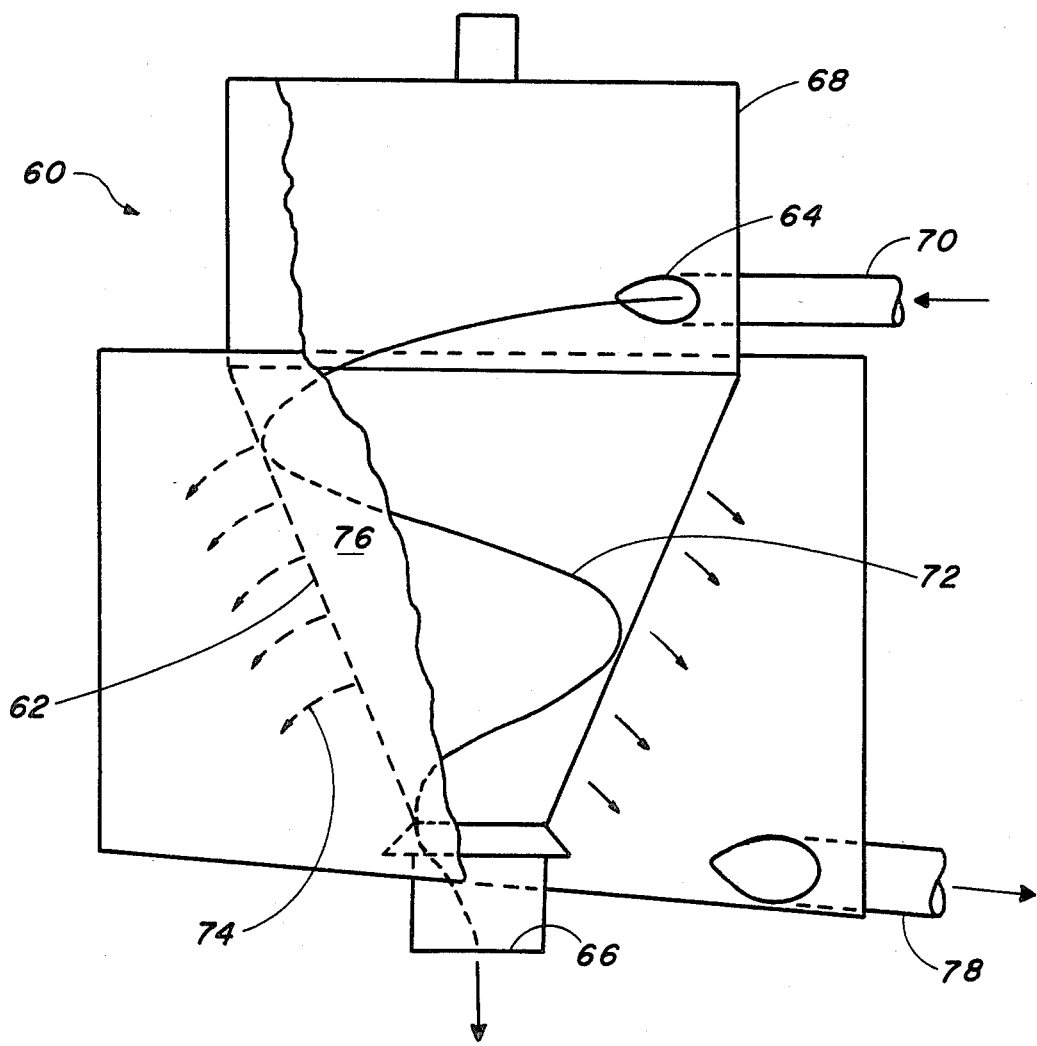
FIG. 3 is a schematic side elevation view of a corn washer receiver of the present invention.

The corn washer receiver of the present invention, indicated generally at 60 in FIG. 3, comprises a generally conical portion having a porous wall member 62, an inlet port 64 and an exit port 66. There may be provided an uppermost head box portion 68 affixed to the upper edge of the conical walls 62.

In operation, the corn water slurry from the soak unit is pumped to the receiver unit 60 through pipe 70 and into the receiver unit through inlet port 64. It has been found that by aligning the entry of slurry through pipe 70 and inlet port 64 in a generally tangential manner, optimum corn-water separation may be effected. The slurry follows a downwardly oriented spiral path indicated by line 72, maintaining a velocity sufficient to separate most of the water 74 from corn 76. The water is removed, as through drain 78 while the corn exits through port 66 to enter a conventional hopper 40, as in FIG. 2.

Because the receiver unit 60 of the present invention is designed such that the corn does not impinge upon a protruding surface, such as lip 28 of FIG. 2, corn damage is significantly reduced. Likewise, due to the frictional engagement of the corn 76 and porous walls 62, the velocity of the corn entering the hopper is significantly reduced, thereby further decreasing corn damage. Of potentially greater significance, the dewatering action of the present invention presents a substantially dewatered corn to the hopper unit, virtually eliminating surge. Because relatively little water is transferred to the hopper with the corn, the metering function provided by the auger is much more precise and a more uniform layer of corn 54 can be presented to the milling unit.

It is believed that the present invention will be more easily understood with reference to the following examples.

EXAMPLE I

A corn washer receiver unit as illustrated in FIG. 3 was installed in one of applicant's commercial chip making plants and tested in the production of a fried corn chip utilizing 50% white corn and 50% yellow corn as well as a fried corn chip utilizing 100% yellow corn. Prior to installation, measurements were made on the existing unit for the amount of water removed by the existing unit by the porous section of the hopper wall 42 (FIG. 2), as well as a measurement of corn damage and corn surging as measured at the conveyor 52.

Similar measurements were made after installation of the apparatus of the present invention. Because there was some concern that the introduction of the corn water slurry containing detritus and small corn pieces might clog up the porous conical walls 62 of the invention, measurements were made to determine the degree, if any, of screen blinding or plugging up of the porous wall.

TABLE 1

|  | PRIOR ART | INVENTION |
|---|---|---|
| Surge (1) | 19.8 ± 8.0% | None Measurable |
| % water removed by receiver | 0 | 70 ± 15% |
| % water removed- Total | 35 ± 3% | 90 ± 5% |
| % increase in corn damage (2) | 3 + 3% | −0.5 ± 1.9% |
| % increase in corn damage (3) | — | −0.6 ± 0.8% |
| screen blinding | Not Applicable | None (4) |

Figure 4:
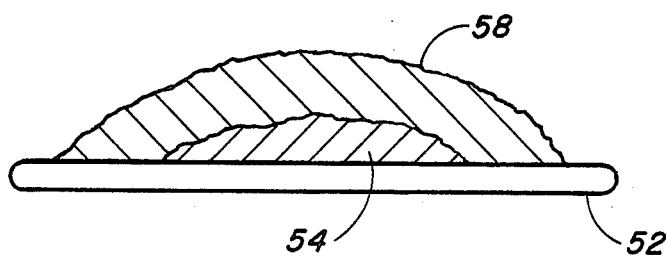
FIG. 4 is a cross-sectional view taken along line 4—4 of FIG. 2.

(1) Measured as percent increase in drain belt corn width (see FIG. 4)
(2) 50% white, 50% yellow corn
(3) 100% yellow corn
(4) After one week of observation As can be seen from Table 1, surging as measured at the conveyor 52 was entirely eliminated. Surging was measured as an increase in the width of the corn bed deposited on conveyor 52, as shown in FIG. 4. Whereas the prior art receiver unit had no capability of moving water from the corn-water slurry (thereby causing the surge problem), the receiver of the present invention removed approximately 70% of the water from the slurry. There was essentially no damage to the incoming corn as a result of the dewatering action of the present invention and, in fact, the corn leaving the inventive receiver appeared to be in somewhat better shape than that corn entering. After approximately one week of operation, little or no screen blinding occurred on the porous walls of the present invention.

EXAMPLE II

A second test was run in a different commercially operating plant making corn chips, the second plant being selected because of its location in an area using "hard" water, which may cause excessive screen blinding, necessitating cleaning of the screen at a frequency greater than a commercially acceptable rate. The cooked and soaked corn utilized in this example is generally somewhat softer than the cooked and soaked corn utilized in Example I; therefore, corn damage estimates were made. While not reported, the water removal rates and surging rates were similar to those reported in Example I.

TABLE II

|  | PRIOR ART | INVENTION |
|---|---|---|
| % increase in corn damage (1) | 1.7 ± 2.4% | 1.9 ± 2.0% |
| % increase in corn damage (2) | 3.6 ± 1.9% | 3.2 ± 2.8% |
| screen blinding | Not Applicable | None (3) |

(1) Lot 1
(2) Lot 2
(3) After one week of observation

As can be seen from Table II, corn damage by use of the present invention was approximately equal to that experienced through use of the prior art receiver unit, while no significant screen blinding was observed during one week of operation.

We claim:

1. A stationary, non-moving dewatering device for separating corn from a corn and water slurry comprising:
   a. an upper cylindrical portion of said device oriented about a vertical axis having walls defining an upper inlet port;
   b. an inverted conical portion adjacent the upper cylindrical portion, the inverted conical portion tapering from top to bottom and defining a lower exit port;
   c. the walls of said inverted conical portion being of a non-protruding surface and defining apertures evenly spaced throughout said non-protruding surface, said apertures being sized to permit the passage therethrough of the water in the corn and water slurry, while preventing the passage therethrough of the corn in the corn and water slurry; and
   d. the upper cylindrical portion defining an inlet port therein, said inlet port being aligned with a corn and water slurry inlet pipe such that said slurry is introduced tangentially into said inverted conical portion;

whereby the slurry is decelerated as it traverses said inverted conical portion, thus minimizing damage to the corn.

2. The device as recited in claim 1, wherein said dewatering device is a centrifugal means and wherein water is separated by centrifugal force from the corn as the corn and water slurry proceeds through the inverted conical portion.

3. A stationary, non-moving dewatering device for separating corn from a corn and water slurry comprising:
   a. an inverted conical portion tapering from top to bottom defining a lower exit port therefrom;
   b. a corn and water slurry inlet pipe immediately adjacent said inverted conical portion, said pipe aligned such that the corn and water slurry is introduced tangentially into said inverted conical portion; and
   c. the walls of said inverted conical portion being of a non-protruding surface and defining apertures evenly spaced throughout said non-protruding surface, said apertures being sized to permit the passage therethrough of the water in the corn and water slurry, while preventing the passage therethrough of the corn in the corn and water slurry;

whereby the slurry is decelerated as it traverses said inverted conical portion, thus minimizing damage to the corn.

4. The device as recited in claim 3, wherein said dewatering device is a centrifugal means and wherein water is separated by centrifugal force from the corn as the corn and water slurry proceeds through the inverted conical portion.

* * * * *